United States Patent
Maguire et al.

(10) Patent No.: US 8,549,920 B1
(45) Date of Patent: Oct. 8, 2013

(54) ACCELERATION STRAIN TRANSDUCER WITH INCREASED SENSITIVITY

(75) Inventors: Jason M. Maguire, Middletown, RI (US); Gregory H. Ames, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1051 days.

(21) Appl. No.: 12/291,048

(22) Filed: Sep. 22, 2009

(51) Int. Cl.
*G01P 15/00* (2006.01)
(52) U.S. Cl.
USPC .................. 73/514.16; 73/862.04; 29/890.07
(58) Field of Classification Search
USPC ..................... 73/514.16, 862.045; 29/890.07
See application file for complete search history.

(56) References Cited

U.S. PATENT DOCUMENTS

| | | | |
|---|---|---|---|
| 2010/0024551 A1* | 2/2010 | Maguire et al. | 73/514.26 |
| 2011/0314935 A1* | 12/2011 | Krippner et al. | 73/862.045 |

* cited by examiner

*Primary Examiner* — Mark Hellner
(74) *Attorney, Agent, or Firm* — James M. Kasischke; Michael P. Stanley; Jean-Paul A. Nasser

(57) ABSTRACT

An accelerometer has a substantially linear strain sensor with a transducer joined to the strain sensor. The transducer has a base that provides rigidity perpendicular to a preferred measurement direction. A plurality of outer flaps are joined to the base supporting the strain sensor. The outer flaps are capable of translating acceleration in the predefined direction to strain in the strain sensor. Two centermost flaps are positioned on either side of the center line of the transducer. Struts are joined between a lower portion of one the centermost flap and an uppermost portion of the nearest outer flap. The struts enhance strain by linking outer flap motion to the centermost flaps. Bridges are joined between each two adjacent outer flaps supporting the strain sensor.

8 Claims, 2 Drawing Sheets

ACCELERATION STRAIN TRANSDUCER WITH INCREASED SENSITIVITY

STATEMENT OF GOVERNMENT INTEREST

The invention described herein may be manufactured and used by or for the Government of the United States of America for Governmental purposes without the payment of any royalties thereon or therefore.

This application is a continuation in part of the prior filed, co-pending, non-provisional application Ser. No. 11/934,846, filed 5 Nov. 2007. This application repeats a substantial portion of prior filed application Ser. No. 11/934,846, filed 5 Nov. 2007, and adds and claims additional disclosure not present in the prior filed application.

CROSS REFERENCE TO OTHER PATENT APPLICATIONS

None.

BACKGROUND OF THE INVENTION (1) Field of the Invention

The present invention relates generally to instruments and more particularly to a transducer that can be used with a strain sensor to make an accelerometer.

(2) Description of the Prior Art

Traditional electrical accelerometers use a magnetic mass supported by a spring in a housing. An induction coil is wound around the interior of the housing. Acceleration is sensed by measuring the electromotive force induced in the induction coil by movement of the magnetic mass. Piezoceramic transducers use a piezoelectric effect to produce a low voltage output in response to force. These sensors usually require a preamplifier to be placed in close proximity. In remote applications, especially those involving arrays of accelerometers, the preamplifiers and telemetry combining signals for transmission to the receive site, can be large and a major factor in the system expense.

Fiber optic sensor systems remove the requirement for preamplification and electronic telemetry. Very low sensitivity accelerometers are based on the acceleration causing two optical waveguides to be misaligned, thus varying the intensity of the light signal. Other accelerometers use large coils of tens of meters of optical fiber. The large amount of fiber and the limited bend diameter of the fiber limit these to fairly large sizes.

Another type of optical accelerometer uses a fiber optic segment positioned between a base and a ridged reaction mass. Acceleration causes the reaction mass to pinch the fiber optic segment against the base. Acceleration can be measured by measuring the modulation of the light passing through the fiber optic segment.

Sometimes it is more convenient to measure strain, and a conventional technique is the use of a force transducer to translate acceleration into strain. Strain sensors include a foil strain gauge having a plurality of foil traces on a backing material. This gauge is mounted on an object to measure elongation of the object. Strain is measured by measuring the increased resistance in the strain gauge. Another linear electrical strain sensor can be constructed by providing mercury or some other conductive material in an elastomeric tube. The elastomeric tube is mounted to the object. Stretching of the tube results in a narrowing of the cross-sectional area which increases electrical resistance in the conductive material. This resistance can be measured giving an indication of strain.

A fiber optic sensor can also be used to measure strain. A piece of fiber optic is provided that has a Bragg grating written in the fiber optic at either end of a sensing region. The sensing region is mounted to an object being measured, and elongation of the sensor can be measured by providing light pulses at a known interval in the fiber optic and collecting the reflected pulses. Elongation of the fiber optic sensor region causes a measurable delay in the pulses.

U.S. patent application Ser. No. 11/934,850, which is incorporated by reference herein, teaches use of a fiber optic laser to measure strain. FIG. 1, below, has additional details concerning the use of fiber laser sensors.

As discussed herein, there is provided an accelerometer having a transducer that can be used with a variety of strain sensors.

SUMMARY OF THE INVENTION

Accordingly, there is provided an accelerometer having a substantially linear strain sensor with a transducer joined to the strain sensor. The transducer has a base that provides rigidity perpendicular to a preferred measurement direction. A plurality of outer flaps are joined to the base supporting the strain sensor. The outer flaps are capable of translating acceleration in the predefined direction to strain in the strain sensor. Two centermost flaps are positioned on either side of the center line of the transducer. Struts are joined between a lower portion of one the centermost flap and an uppermost portion of the nearest outer flap. The struts enhance strain by linking outer flap motion to the centermost flaps. Bridges are joined between each two adjacent outer flaps supporting the strain sensor.

BRIEF DESCRIPTION OF THE DRAWINGS

The foregoing invention will become readily apparent by referring to the following detailed description and the appended drawings in which.

DETAILED DESCRIPTION OF THE INVENTION

Figure 1:
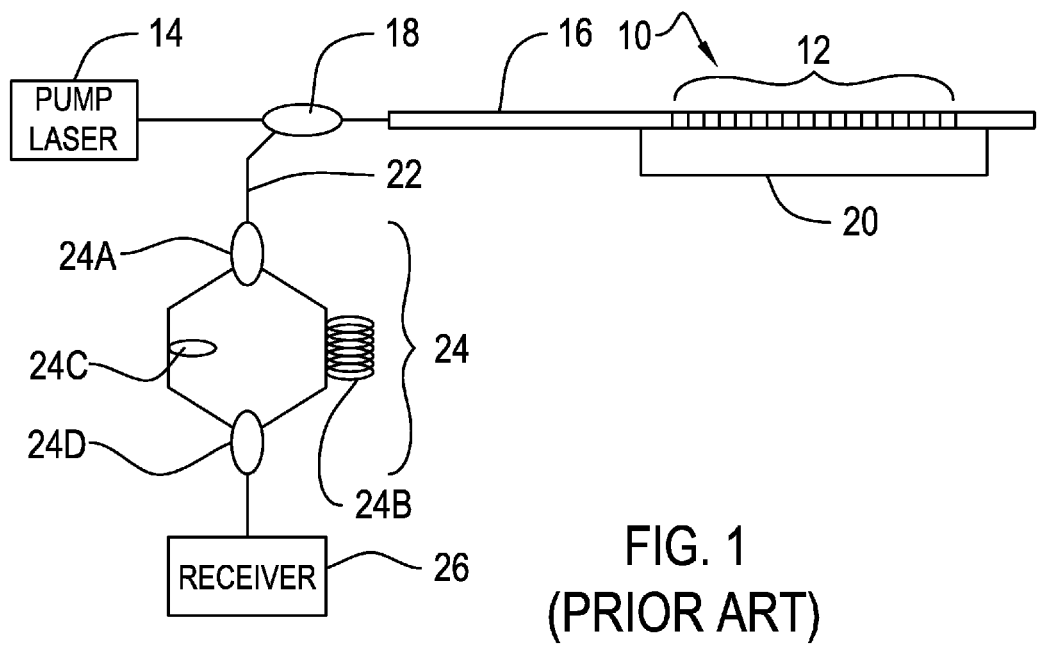
FIG. 1 is a diagram showing a fiber optic laser sensor accelerometer.

FIG. 1 shows an accelerometer utilizing a fiber laser sensor. The fiber laser accelerometer 10 includes a fiber laser 12. Fiber laser 12 can be either a Fabry-Perot type cavity fiber laser or a distributed feedback fiber laser. In a Fabry-Perot type fiber laser, the laser cavity is a length of erbium-doped optical fiber with a Bragg grating written in the fiber core at either end of the laser cavity. In a distributed feedback fiber laser, the fiber laser cavity is a length of erbium-doped optical fiber having a grating written over the full length of the cavity. The distributed feedback fiber laser will have a phase shift at the center of the cavity. A pump laser 14 is provided for transmitting coherent light through optical fiber 16. Pump laser 14 can be any laser such as a diode laser operating at 980 nm or 1480 nm. Pump laser 14 is joined by fiber 16 to a distributor 18. Distributor 18 can be a wavelength division multiplexer, circulator or the like. A wavelength division multiplexer operates by providing light at the pump laser wavelength to the fiber laser 12. Returning light from the fiber laser 12 is at a different frequency and is guided along a different path. A circulator can carry out the same function by transferring light to the next port of the circulator.

After coherent light passes through distributor 18, it is absorbed by the doping material in fiber laser 12. Absorption of this light causes the doping material to emit photons which are gathered by resonance between the gratings. This causes fiber laser 12 to emit a narrow single mode of light. Fiber laser 12 is mounted to a transducer 20 such that acceleration of the transducer material strains the fiber laser cavity. This strain shifts the emission wavelength of the fiber laser 12. Transducer 20 can have a wide variety of constructions that will be discussed hereinafter.

Fiber laser emission returns along fiber 16 to wavelength division multiplexer 18 where it is separated onto analysis path 22. An interferometer 24 such as a Mach-Zehnder interferometer is positioned on analysis path 22. Interferometer 24 converts the shifted emission wavelength of fiber laser into a phase shift of the fiber laser light. Interferometer 24 typically includes a first beam splitter 24A having a delay loop 24B on one leg and a modulator 24C on the second leg. Signals from the delay loop 24B and modulator 24C are combined in a second beam splitter 24D to produce the phase shifted signal. Other interferometer designs can produce the same type of signal. A receiver 26 receives the phase shifted signal. Receiver 26 is capable of demodulating and detecting the signal from the fiber laser by various methods well known in the art.

Figure 2:
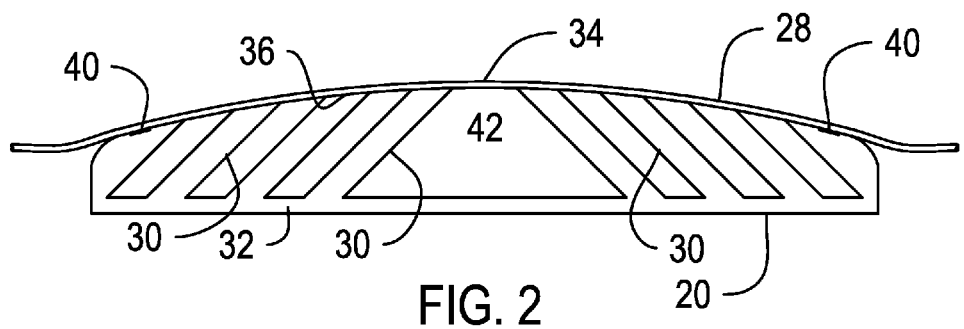
FIG. 2 is a diagram showing an accelerometer having a transducer constructed according to a first embodiment.

FIG. 2 provides a transducer 20. Transducer 20 can be used with any linear strain sensor 28. These include foil resistance strain sensors, conductive liquid strain sensors, optical delay strain sensors, fiber laser strain sensors, or the like. Transducer 20 functions to translate acceleration into strain in strain sensor 28.

Transducer 20 has at least one flap 30. Flap 30 is attached to a base 32 of the transducer 20 and extends toward a center 34 of strain sensor 28 at an angle. Equal numbers of flaps 30 can be provided on each side of center 34, and all flaps 30 angle toward the center 34. Transducer 20 can be made from a polymer material. Transducer 20 allows vertical movement of flaps 30, as shown, but resists movement in the transverse direction because of its geometry. Movement in the longitudinal direction cannot be controlled without affecting the vertical motion induced by acceleration. The affect of the longitudinal motion tends to cancel out because of the flap arrangement. The volume in between flaps 30 can be a vacuum, gas, liquid, or solid; however, it should allow movement of flaps 30. A gas, liquid or solid could provide damping, if necessary. In this embodiment, the combined top surfaces 36 of the flaps 30 form an interrupted surface 38 that is higher near center 34. Sensor 28 is mounted under tension across the top surfaces 36 of the flaps 30 and fixed to the outer two flaps with an adhesive 40 such as ultra-violet cured epoxy. Adhesive 40 should not interfere with sensor 28. Mounting to the outermost flaps 30 reduces the constraint on the ends of the sensor 28 and yields greater sensitivity to acceleration.

Increasing the height of interrupted surface 38 near center 34 allows sensor 28 contact with all of the flap upper surfaces 36. Friction holds the sensor 28 in place laterally. The body of each flap 30 serves as an inertial mass. When transducer 20 is accelerated away from sensor 28, flaps 30 move toward sensor 28 and outward from the center 34 due to the angle of the flaps 30. This causes an unsupported portion 42 of the sensor 28 between the centermost two flaps 30 to be further tensioned. The outer flaps 30 move with the inner flaps 30 and produce additional strain on the fiber portion at center 34. The flaps 30 have sufficient width in the direction perpendicular to the direction being sensed to ensure that the flaps 30 are much more stiff against motion in that direction. This stiffness in the transverse direction ensures that the accelerometer 10 has good isolation against responding to accelerations in that direction, known as cross-axis isolation. Transducer 20 structure also provides good isolation against longitudinal accelerations in the direction parallel to sensor 28. In this direction, the half of the flaps 30 on one side of the center 34 move upward and outward, while the half of the flaps 30 on the other side of the center 34 move downward and inward. These two motions tend to cancel, producing little net strain on the center 34 of the sensor 28.

The unsupported fiber portion 40 between the center two flaps 30 can also vibrate in a string mode. This mode is undesirable because it is equally susceptible to acceleration in both directions transverse to the sensor 28. Thus, it is desirable to minimize this mode and push its resonance to a frequency above that in the sensing range. The response of this mode is controlled by mounting the sensor 28 to the transducer 20 with sufficient tension.

A transducer of this form is basically a mass/spring system operated well below resonance. In an idealized mass/spring system the natural or resonant frequency of the system is given by the following equation:

$$\omega_n = \left(\frac{K}{M}\right)^{\frac{1}{2}} \tag{1}$$

where $\omega_n$ is the natural frequency, M is the mass, and K is the spring stiffness. A harmonic acceleration can be given by the following equation:

$$a = a_0 \cos \omega t \tag{2}$$

Under these conditions, the displacement of the mass, M, is harmonic with amplitude X given by:

$$X = \frac{\frac{Ma_0}{K}}{\left(1 - \left(\frac{\omega}{\omega_n}\right)^2\right)} \tag{3}$$

The sensitivity of a sensor based on this system is given by $S = X/a_0$. At frequencies well below the resonant frequency, $\omega_n$, this is approximated by:

$$S = \left(\frac{X}{a_0}\right) = \frac{M}{K} \tag{4}$$

In the accelerometer, the maximum strain on the sensor 28 is related to the maximum displacement of the flap 30 masses. It can be seen from these equations that both resonant frequency, $\omega_n$, and displacement X (or sensitivity S) are directly related to the ratio K/M. If the system is designed for a particular resonant frequency to give a desired bandwidth sensor, the sensitivity is predetermined. In general, it is desired that the sensitivity S be maximized for a particular resonant frequency. These equations indicate that this is not possible for the idealized mass spring system. However, in a non-idealized system not consisting of a point mass, the limitation on displacement refers to the motion of the center of mass.

Figure 3:
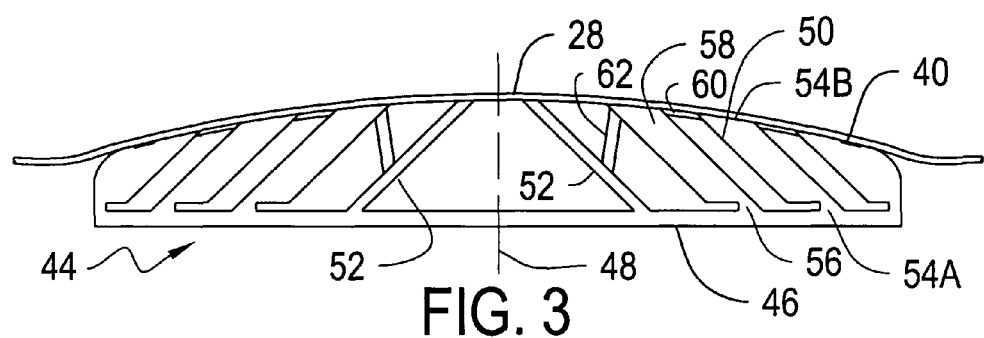
FIG. 3 is a diagram showing an accelerometer having a transducer constructed according to a second embodiment.

FIG. 3 shows an embodiment of a transducer 44 having enhanced sensitivity. As above, sensor 28 is fixed in tension to the top of transducer 44. Sensor 28 is joined to transducer 44 by adhesive 40. Transducer 44 has a base 46 and is symmetrical about a center line 48.

This embodiment has outer flaps 50 and centermost flaps 52 for translating accelerations perpendicular (upward in the FIG.) to transducer 44 into tensions in sensor 28. The centermost flaps 52 are positioned on each side of and proximate to center line 48, and the outer flaps 50 are positioned horizontally along base 46 between the centermost flap 52 and an end of base 46. A first end 54A of each flap is joined to base 46 and a second end 54B of each flap supports sensor 28. The second ends 54B of combined flaps form a curved surface for maintaining contact between the flaps and the sensor. The flaps are angled towards the center line 48 of the transducer 44.

The flaps are configured based on their position in transducer 44. Outer flaps 50 each have a neck 56 joined to a body 58. Neck 56 acts to reduce the spring constant K of the outer flap 50. Body 58 acts as a mass. One bridge 60 is joined between each adjacent outer flap 50. A strut 62 is joined between a lower portion of each centermost flap 52 and an upper portion of the adjacent outer flap 50.

The centermost flaps 52 are designed to be stiff but less massive than outer flaps 50. The outer flaps 50 have most of their mass away from base 46 to maximize the force that they apply to the centermost flap 52. Resonance frequency of the outer flaps 50 is maintained by having greater stiffness than the centermost flaps 52. Stiffness can be adjusted by changing the width of the centermost flaps 52 or by providing voids in the flaps or necks.

In operation, when the transducer is accelerated vertically, inertia of outer flaps 50 causes them to move downward toward base 46 and toward center line 48. The second ends 54B of outer flaps 50 move together because of linking by bridges 60. Struts 62 transfer this force to centermost flaps 52. Each centermost flap 52 acts as a lever arm. A small motion of strut 62 results in a relatively large motion at second ends 54B of centermost flaps 52. This movement reduces tension in sensor 28 between centermost flaps 52.

Figure 4:
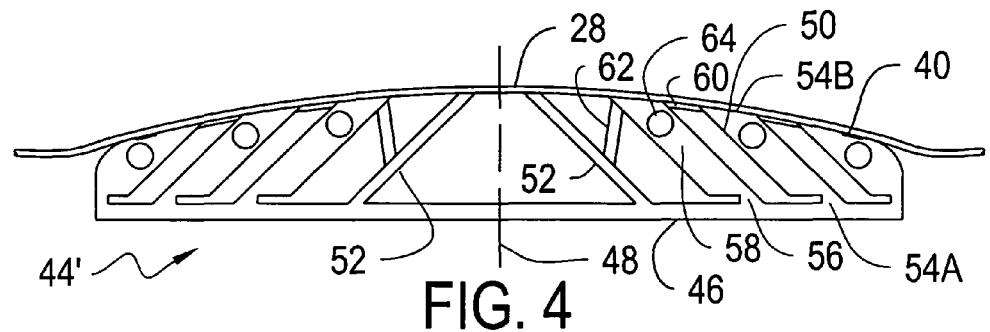
FIG. 4 is a diagram showing an accelerometer having a transducer constructed according to a third embodiment.

FIG. 4 shows an alternative embodiment of the invention. This embodiment utilizes high density masses 64 positioned in body 58 of outer flaps 50. Masses 64 can help tailor the resonance frequency of transducer 44.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. An accelerometer comprising:
   a strain sensor having a substantially linear configuration; and
   a transducer joined to said strain sensor such that said strain sensor extends laterally across said transducer, said transducer being symmetrical about a center line and having:
   a base extending along said strain sensor and providing rigidity of said transducer in at least one direction perpendicular to a predefined direction;
   a plurality of outer flaps joined at a first end to the base and supporting said strain sensor at a second end, the outer flaps being capable of translating acceleration in the predefined direction to strain in said strain sensor;
   at least two centermost flaps positioned on either side of the center line of said transducer, each centermost flap being joined at a first end to the base and supporting said strain sensor at a second end;
   at least two struts, each strut being joined between a lower portion of one said centermost flap and an uppermost portion of the nearest outer flap; and
   bridges joined between each two adjacent outer flaps at said second end, said bridges supporting said strain sensor.

2. The device of claim 1 wherein:
   said outer flaps are angled from said base toward the center line of said strain sensor; and
   said centermost flaps are angled from said base toward the center line of said strain sensor.

3. The device of claim 2 wherein said transducer has the same number of outer flaps on either side of said strain sensor.

4. The device of claim 1 wherein said transducer further has mounting portions on either end of said transducer, said strain sensor being joined to said transducer mounting portions.

5. The device of claim 1 wherein said outer flap comprises:
   a body proximate said outer flap second end; and
   a neck positioned between said body and said base at said outer flap first end, said neck creating a reduced stiffness for deflection of said outer flap.

6. The device of claim 5 wherein said outer flap further comprises a mass positioned in said flap mass for increasing the mass of said body and changing the frequency response of said transducer.

7. The device of claim 1 wherein the strain sensor is a selected one of a fiber optic laser strain sensor, a fiber optic strain sensor, a foil strain sensor or a liquid filled tube strain sensor.

8. The device of claim 1 wherein the strain sensor is joined on said transducer under tension.

* * * * *